(12) United States Patent
Fetvadjiev et al.

(10) Patent No.: US 10,887,283 B2
(45) Date of Patent: Jan. 5, 2021

(54) SECURE EXECUTION AND TRACKING OF WORKFLOWS IN A PRIVATE DATA CENTER BY COMPONENTS IN THE CLOUD

(71) Applicant: VMware, Inc., Palo Alto, CA (US)

(72) Inventors: Kalin Georgiev Fetvadjiev, Sofia (BG); Dobrin Slavov Ivanov, Sofia (BG)

(73) Assignee: VMware, Inc., Palo Alto, CA (US)

(*) Notice: Subject to any disclaimer, the term of this patent is extended or adjusted under 35 U.S.C. 154(b) by 304 days.

(21) Appl. No.: 15/853,271

(22) Filed: Dec. 22, 2017

(65) Prior Publication Data

US 2018/0183762 A1 Jun. 28, 2018

Related U.S. Application Data

(60) Provisional application No. 62/438,154, filed on Dec. 22, 2016.

(51) Int. Cl.
| | | |
|---|---|---|
| *G06F 9/50* | (2006.01) | |
| *H04L 29/06* | (2006.01) | |
| *H04L 29/08* | (2006.01) | |
| *G06F 21/62* | (2013.01) | |
| *G06F 9/455* | (2018.01) | |
| *G06F 9/54* | (2006.01) | |
| *G06F 21/53* | (2013.01) | |

(52) U.S. Cl.
CPC ...... *H04L 63/0272* (2013.01); *G06F 9/45558* (2013.01); *G06F 9/5072* (2013.01); *G06F 9/542* (2013.01); *G06F 21/53* (2013.01); *G06F 21/6263* (2013.01); *H04L 63/04* (2013.01); *H04L 67/10* (2013.01); *G06F 2009/4557* (2013.01); *G06F 2009/45595* (2013.01)

(58) Field of Classification Search
CPC ............ G06F 9/45558; G06F 9/45562; G06F 9/4557; G06F 9/45575; G06F 9/45587; G06F 9/45595; G06F 9/5072; G06F 9/542; G06F 9/4558; G06F 2009/4557; G06F 2009/45595; G06F 21/53; G06F 21/6263; G06Q 10/10; G06Q 10/06; H04L 63/0272; H04L 63/04; H04L 67/10
See application file for complete search history.

(56) References Cited

U.S. PATENT DOCUMENTS

| | | | | |
|---|---|---|---|---|
| 2014/0006475 A1* | 1/2014 | Harpster | ................. | G06F 16/95 709/202 |
| 2016/0048408 A1* | 2/2016 | Madhu | ................ | G06F 11/2023 718/1 |
| 2016/0105378 A1* | 4/2016 | Xia | ........................ | H04L 49/254 370/381 |
| 2016/0132214 A1* | 5/2016 | Koushik | ................. | G06F 9/455 715/741 |

* cited by examiner

*Primary Examiner* — Alexander Lagor
*Assistant Examiner* — Vu V Tran
(74) *Attorney, Agent, or Firm* — Patterson + Sheridan, LLP (57) ABSTRACT

One or more embodiments provide techniques for executing a workflow in a private data center. The cloud data center receives a request from a user. The cloud data center publishes an event to an event queue in the cloud data center. An event handler in the private data center accesses the event queue. The event handler executes the workflow in response to the event in the private data center. The event handler publishes the results of the workflow in the cloud data center.

17 Claims, 3 Drawing Sheets

SECURE EXECUTION AND TRACKING OF WORKFLOWS IN A PRIVATE DATA CENTER BY COMPONENTS IN THE CLOUD

CROSS-REFERENCE TO RELATED APPLICATIONS

This application claims priority to U.S. Provisional Patent Application Ser. No. 62/438,154, filed Dec. 22, 2016, which is incorporated by reference herein in its entirety.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer data centers (referred to herein as "private data centers"). The public cloud can include a multi-tenant cloud architecture providing IaaS cloud services.

SUMMARY

One or more embodiments provide techniques for executing a workflow in a private data center. The cloud data center receives a request from a user. The cloud data center publishes an event to an event queue in the cloud data center. An event handler in the private data center accesses the event queue. The event handler executes the workflow in response to the event in the private data center. The event handler publishes the results of the workflow in the cloud data center.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
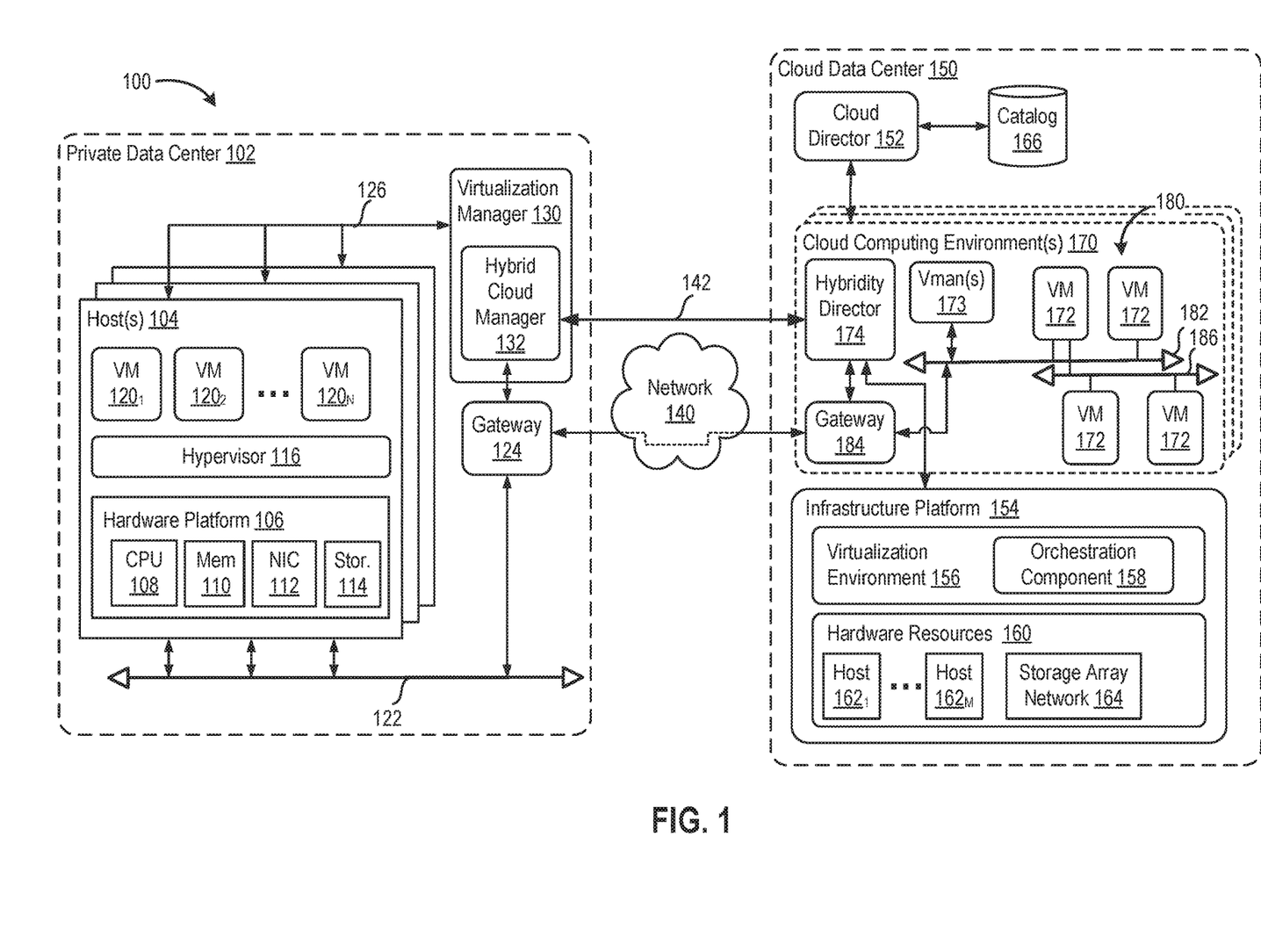
FIG. 1 is a block diagram of a hybrid cloud computing system, according to one embodiment disclosed herein.

FIG. 1 is a block diagram of a hybrid cloud computing system 100 in which one or more embodiments of the present disclosure may be utilized. Hybrid cloud computing system 100 includes a virtualized computing system implementing a private data center 102 and a virtualized computing system implementing a cloud data center 150. Hybrid cloud computing system 100 is configured to provide a common platform for managing and executing virtual workloads seamlessly between private data center 102 and cloud data center 150. In one embodiment, private data center 102 may be a data center controlled and administrated by a particular enterprise or business organization, while cloud data center 150 may be operated by a cloud computing service provider and exposed as a service available to account holders, such as the particular enterprise in addition to other enterprises. As such, private data center 102 may sometimes be referred to as a "private" cloud, and cloud data center 150 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Private data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within private data center 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

Private data center 102 includes a virtualization management component (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in private data center 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud data center 150 with virtualized computing resources of computing system 102 to form a unified "hybrid" computing platform. Hybrid cloud manager 132 is configured to deploy VMs in cloud data center 150, transfer VMs from virtualized computing system 102 to cloud data center 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in private data center 102 with connectivity to an external network 140 (e.g., Internet). Gateway 124 may manage external public IP addresses for VMs 120 and route traffic incoming to and outgoing from private data center 102 and provide networking services, such as firewalls, network address translation (NAT), dynamic host configuration protocol (DHCP), load balancing, and virtual private network (VPN) connectivity over a network 140.

In one or more embodiments, cloud data center 150 is configured to dynamically provide an enterprise (or users of an enterprise) with one or more virtual data centers 170 in which a user may provision VMs 120, deploy multi-tier applications on VMs 120, and/or execute workloads. Cloud data center 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud data center 150 may in fact be distributed across multiple data centers in different locations.

Each cloud computing environment 170 is associated with a particular tenant of cloud data center 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud data center 150). In other embodiments, cloud computing environment 170 may be configured as part of a multi-tenant cloud service with logically isolated virtualized computing resources on a shared physical infrastructure. As shown in FIG. 1, cloud data center 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to private data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud data center 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 1, cloud computing environment 170 supports the creation of a virtual data center 180 having a plurality of virtual machines 172 instantiated to, for example, host deployed multi-tier applications, as well as one or more virtualization managers 173 (abbreviated as "Vman(s)"). A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160. Virtualization managers 173 can be configured similarly to virtualization manager 130.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within private data center 102. In other embodiments, gateway 184 may be configured to connect to communicate with private data center 102 using a high-throughput, dedicated link (depicted as a direct connect 142) between private data center 102 and cloud data center 150. In one or more embodiments, gateways 124 and 184 are configured to provide a "stretched" layer-2 (L2) network that spans private data center 102 and virtual data center 180, as shown in FIG. 1.

While FIG. 1 depicts a single connection between private gateway 124 and cloud-side gateway 184 for illustration purposes, it should be recognized that multiple connections between multiple private gateways 124 and cloud-side gateways 184 may be used. Furthermore, while FIG. 1 depicts a single instance of a gateway 184, it is recognized that gateway 184 may represent multiple gateway components within cloud data center 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud data center 150 may be used to manage all public-facing traffic incoming and outgoing from cloud data center 150.

In one embodiment, each virtual data center 180 includes a "hybridity" director module (depicted as hybridity director 174) configured to communicate with the corresponding hybrid cloud manager 132 in private data center 102 to enable a common virtualized computing platform between private data center 102 and cloud data center 150. Hybridity director 174 (e.g., executing as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud data center 150 via infrastructure platform 154.

Figure 2:
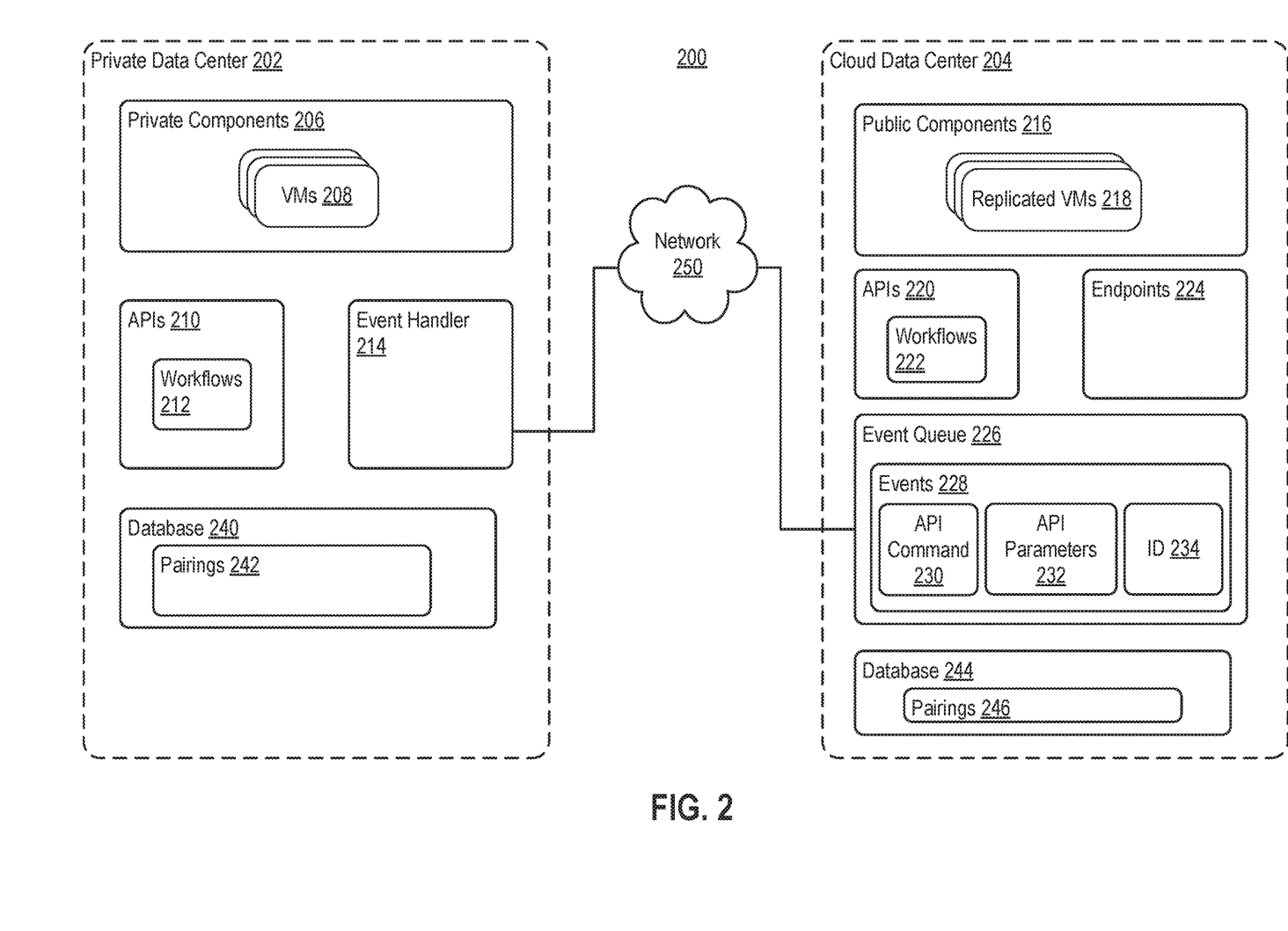
FIG. 2 is a logical diagram of the hybrid cloud computing system of FIG. 1, according to one embodiment disclosed herein.

FIG. 2 is a logical diagram of a hybrid cloud computing system 200, according to one embodiment. Hybrid cloud computing system 200 includes a private data center 202 and cloud data center 204. Private data center 202 may include private component(s) 206. For example, private components 206 may be VMs, virtual networks, and the like. Private component(s) 206 may be implemented using one or more hosts. Each host may be configured to provide a virtualization layer that abstracts processor, memory, storage, and networking resources of a hardware platform (e.g., hardware platform 156) into multiple virtual machines that run concurrently on the same host. In the example shown, private component(s) 206 include one or more VMs 208.

Cloud data center 204 may be operated by a cloud computing service provider and exposed as a service available to account holders, such as the particular enterprise in addition to other enterprises. Cloud data center 204 may include public component(s) 216. Public components 216 may include replicated VM(s) 218. A replicated VM is, generally, a copy of an original VM. For example, each of the replicated VMs 218 corresponds to one of the VMs 208 of private data center 202. Replicating VMs 208 of private data center 202 is a data protection strategy in which each of VMs 208 is replicated to provide some measure of redundancy. Replication may be used for many purposes, such as ensuring data availability upon storage failures, site disasters, planned maintenance, or the like.

Cloud data center 204 further includes an event queue 226. Event queue 226 is configured to communicate with private data center 202 over network 250. Event queue 226 allows for trust to be established between cloud data center 204 and private data center 202 without exposing the infrastructure of private data center 202 (i.e., private components 206) through a public IP, VPN, or tunnel-based solutions to public components 216 running in cloud data center 204. For example, event queue 226 communicates with private data center 202 over network 250 via an event handler 214 in private data center 202.

Event queue 226 is configured to store event(s) 228 that may be posted to event queue 226. For example, an event that may be published to event queue 226 may be a disaster recovery event in response to a failover of a VM 208 to a VM 218. Each event 228 may include an API command 230, API parameters 232, and an ID 234. API command 230 may be indicative of the APIs necessary for carrying out event 228. API parameters 232 are typically the compute requirements for executing the specific API command 230. For example, API parameters 232 may contain the allocation settings that are necessary for API command 230. Cloud data center 204 further includes endpoint(s) 224. Endpoint 224 may be the destination to receive replies once events are completed. For example, an endpoint may have a certain IP address to receive status of a completed event. Cloud data center 204 also includes a set of APIs 220 having workflows 222. A workflow 222 is a series of actions and decisions to be executed in connection with VMs 218. For example, a user may access an API 220 for carrying out a workflow 222 of publishing an event to event queue 226.

Referring to private data center 202, private data center 202 includes event handler 214. Event handler 214 is configured to access event queue 226 to process events 228 contained therein. In some embodiments, event handler 214 may continuously poll event queue 226 to determine whether there are any outstanding events 228 published therein. In another embodiment, event handler 214 may periodically poll event queue 226 at pre-set times to determine whether there are any outstanding events 228 published therein. In other embodiments, event queue 226 may send a notification to event handler 214 over network 250 that events 228 are published therein.

Private data center 202 may further include a set of APIs 210 having workflow(s) 212. A workflow 212 is a series of actions and decisions to be executed in connection with VMs 208. Each workflow 212 includes various phases for managing VMs (e.g., allocation phase, provisioning phase, etc.). For example, a workflow 212 can include an allocation phase and APIs 210 may include a given subset of APIs corresponding to the allocation phase. Event handler 214 executes workflows 212 corresponding to API command 230 of an event 228. Workflows 212 take into account API parameters 232 associated with API command 230 of a given event 228. Event handler 214 executes a workflow 212 within private data center 202. In some embodiments, event handler 214 monitors the state of a workflow 212 during execution. For example, event handler 214 may update the endpoint 224 associated with event 228 with the state and progress of workflow 212. When event handler 214 finishes execution of workflow 212, event handler 214 publishes the result at the endpoint 224 specified in cloud data center 204.

In some embodiments, private data center 202 may include a database 240 storing pairing(s) 242. Each pairing 242 establishes a trust relationship between a private component 206 with a public component 216. In some embodiments, event handler 214 only polls those events for which there is a known pairing. Such pairings "authorize" event handler 214 to perform the workflow associated with event 228. Cloud data center 204 may also include a database 244 storing pairing(s) 246. Pairings 246 can mirror pairings 242 stored in database 240.

Figure 3:
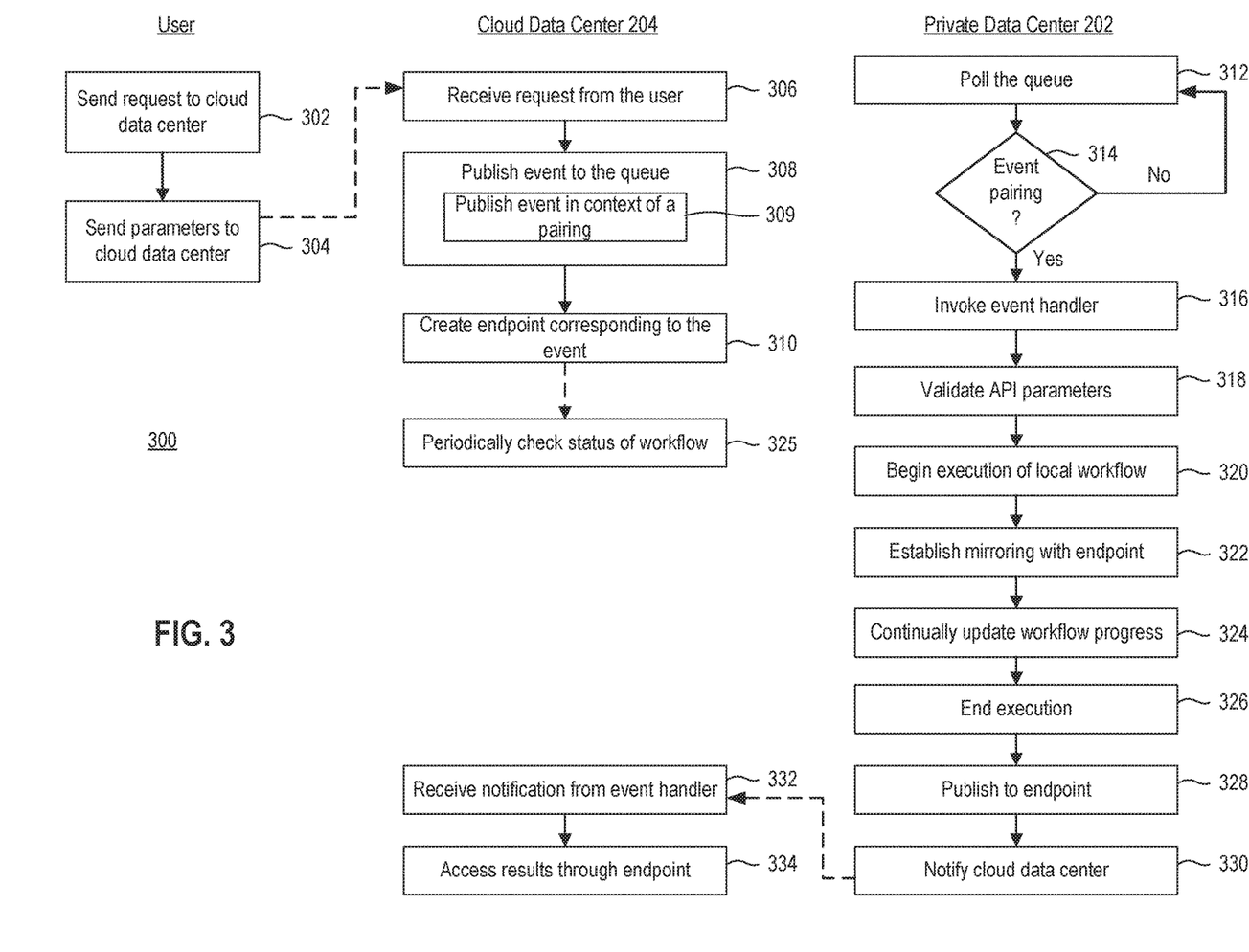
FIG. 3 is a flow diagram illustrating a method of executing and tracking workflows in a private data center with restricted network access, according to one embodiment disclosed herein.

FIG. 3 is a flowchart illustrating a method 300 of executing and tracking workflows in a private data center with restricted network access, according to one embodiment. At step 302, a user of a public cloud transmits a request to cloud data center 204. For example, the user may transmit a request to cloud data center 204 to begin a disaster recovery process. At step 304, the user may optionally transmit parameter(s) to the cloud data center for the event. For example, the user may transmit to the cloud data center API parameters 232 corresponding to the event transmitted. In other embodiments, cloud data center 204 may generate API parameters 232 on the cloud side.

At step 306, cloud data center 204 receives at least the event request from the user. In some embodiments, cloud data center 204 will also receive API parameters 232 along with the event request. Cloud data center 204 then publishes the event to event queue 226 (step 308). Event queue 226 is configured to house event(s) 228. For example, an event that may be published to event queue 226 may be a disaster recovery event in response to a replicated VM 218 acting abnormally. Event queue 226 allows for trust to be established between cloud data center 204 and private data center 202 without exposing the infrastructure of private data center 202 (i.e., private components 206) through a public IP, VPN, or tunnel-based solutions to public components 216 running in cloud data center 204. At step 310, cloud data center 204 creates an endpoint in endpoints 224 for the event received from the user. In some embodiments, cloud data center 204 may create an endpoint in the form of an IP address to be updated periodically during the execution process in the private data center. For example, cloud data center 204 may create an endpoint to which private data center 202 will publish the results of the disaster recovery event.

In some embodiments, step 308 includes substep 309. At substep 309, cloud data center 204 publishes the event in the context of the pairing associated with the involved API resource, i.e. replicated VM 218. The "pairing" is defined as an existing established trust of a private component 206 of private data center 202 with public component 216 of cloud data center 204. Publishing the event into event queue 226 in context of the pairing aids in establishing the trust between private data center 202 and cloud data center 204. At step 310, cloud data center 204 creates an endpoint in endpoints 224 for the event received from the user. For example, cloud data center 204 may create an endpoint in the form of an IP address to be updated periodically during the execution process in the private data center.

Either periodically or continuously, event handler 214 in private data center 202 polls event queue 226 in cloud data center 204 to determine if there are any events published in event queue 226 (step 312). At decision step 314, event handler 214 determines if there are any events published in event queue 226. If there are not any events published in event queue 226, then the method reverts to step 312 to either continuously or periodically poll event queue 226. If there are events published in the event queue, then at step 316, private data center 202 invokes event handler 214 to carry out the workflow necessary for event 228. Event handler 214 is configured to access event queue 226 to process events 228 contained therein. As such, event handler 214 bridges the gap between cloud data center 204 and private data center 202 over network 250 without exposing private components 206 of private data center 202.

At step 318, event handler 214 determines the API command and the API parameters associated with the event in event queue 226. For example, the API command may correspond to a sub-step of a disaster recovery event, such as powering down the VM. Event handler 214 checks the API parameters to ensure that there is necessary compute power allocated to the VM to power down the VM. At step 320, event handler 214 begins execution of workflows 212 necessary to perform event 228. For example, event handler 214 executes workflows 212 in VM 208 corresponding to the replicated VM in cloud data center 204 for which the disaster recovery process is being performed.

In some embodiments, at step 322 event handler 214 establishes a mirroring between private data center 202 and cloud data center 204. For example, event handler 214 may establish a mirroring between private data center 202 and cloud data center 204 via the endpoint in endpoint 224 associated with the event. At step 324, event handler 214 updates progress of execution of the workflow in VM 208. For example, event handler 214 updates the progress of execution of the workflow in VM 208 via the endpoint associated with the event. At step 325, cloud data center 204 may access the updates via the endpoint. At step 326, event handler 214 ends execution once the workflow has been complete.

Event handler 214 then publishes that execution has ended to the endpoint (step 328). For example, event handler 214 publishes that execution has ended to the endpoint associated with the event in endpoint 224 of cloud data center 204. Event handler 214 then notifies cloud data center 204 that the workflow has continued executing (step 330). Cloud data center 204 receives the notification from cloud data center 204 (step 332). For example, cloud data center 204 accesses the endpoint associated with the event in endpoint 224. Cloud data center 204 may then access the results of the execution (step 334).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of executing a workflow in a private data center, comprising:
   receiving a request from a user at a cloud data center, the request relating a virtualization component in the cloud data center with a virtualization component in the private data center;
   publishing an event to an event queue in the cloud data center, the event published in the context of a pairing between the virtualization component in the cloud data center and the virtualization component in the private data center, wherein the virtualization component in the cloud data center is a replicate of the virtualization component in the private data center;
   accessing the event queue with an event handler in the private data center, wherein accessing the event queue with an event handler in the private data center comprises: establishing a secure connection between the private data center and the cloud data center over a network without exposing the virtualization component of the private data center to the cloud data center,
   executing the workflow in response to the event in the private data center and in response to verification of the pairing; and
   publishing results of the workflow to the cloud data center.

2. The method of claim 1, wherein accessing the event queue with an event handler in the private data center, comprises:
   polling the event queue to determine whether the event queue contains an event therein.

3. The method of claim 1, further comprising:
   creating an endpoint in the cloud data center corresponding to the event queue, wherein the event handler publishes the results of the workflow to the endpoint.

4. The method of claim 1, wherein accessing the event queue with an event handler in the private data center, comprises:
   sending a notification to the event handler from the cloud data center to the private data center that the event is published in the event queue.

5. The method of claim 1, wherein executing the workflow in response to the event in the private data center, comprises:
   accessing an application programming interface (API) code and an API parameters contained in the event request to allocate necessary resources to the virtualization component in the private data center for execution.

6. The method of claim 1, wherein the virtualization component in the cloud data center and the virtualization component in the private data center are virtual machines.

7. A computer system, comprising:
   a processor; and
   a memory storing program code, which, when executed on the processor, performs a method of executing a workflow in a private data center, comprising:
   receiving a request from a user at a cloud data center, the request relating a virtualization component in the cloud data center with a virtualization component in the private data center;
   publishing an event to an event queue in the cloud data center, the event published in the context of a pairing between the virtualization component in the cloud data center and the virtualization component in the private data center, wherein the virtualization component in the cloud data center is a replicate of the virtualization component in the private data center;
   accessing the event queue with an event handler in the private data center, wherein accessing the event queue with an event handler in the private data center comprises: establishing a secure connection between the private data center and the cloud data center over a network without exposing the virtualization component of the private data center to the cloud data center,
   executing the workflow in response to the event in the private data center and in response to verification of the pairing; and
   publishing results of the workflow to the cloud data center.

8. The computer system of claim 7, wherein accessing the event queue with an event handler in the private data center, comprises:
   polling the event queue to determine whether the event queue contains an event therein.

9. The computer system of claim 7, further comprising:
   creating an endpoint in the cloud data center corresponding to the event queue, wherein the event handler publishes the results of the workflow to the endpoint.

10. The computer system of claim 7, wherein accessing the event queue with an event handler in the private data center, comprises:
    sending a notification to the event handler from the cloud data center to the private data center that the event is published in the event queue.

11. The computer system of claim 7, wherein executing the workflow in response to the event in the private data center, comprises:
    accessing an application programming interface (API) code and an API parameters contained in the event request to allocate necessary resources to the virtualization component in the private data center for execution.

12. The computer system of claim 7, wherein the virtualization component in the cloud data center and the virtualization component in the private data center are virtual machines.

13. A non-transitory computer readable medium comprising instructions, which when executed in a computer system, causes the computer system to carry out a method of executing a workflow in a private data center, comprising:
    receiving a request from a user at a cloud data center, the request relating a virtualization component in the cloud data center with a virtualization component in the private data center;
    publishing an event to an event queue in the cloud data center, the event published in the context of a pairing between the virtualization component in the cloud data center and the virtualization component in the private data center, wherein the virtualization component in the cloud data center is a replicate of the virtualization component in the private data center;
    accessing the event queue with an event handler in the private data center, wherein accessing the event queue with an event handler in the private data center corn rises: establishing a secure connection between the private data center and the cloud data center over a network without exposing the virtualization component of the private data center to the cloud data center,
    executing the workflow in response to the event in the private data center and in response to verification of the pairing; and publishing results of the workflow to the cloud data center.

14. The non-transitory computer readable medium of claim 13, wherein accessing the event queue with an event handler in the private data center, comprises:
   polling the event queue to determine whether the event queue contains an event therein.

15. The non-transitory computer readable medium of claim 13, further comprising:
   creating an endpoint in the cloud data center corresponding to the event queue, wherein the event handler publishes the results of the workflow to the endpoint.

16. The non-transitory computer readable medium of claim 13, wherein executing the workflow in response to the event in the private data center, comprises:
   accessing an application programming interface (API) code and an API parameters contained in the event request to allocate necessary resources to the virtualization component in the private data center for execution.

17. The non-transitory computer readable medium of claim 13, wherein the virtualization component in the cloud data center and the virtualization component in the private data center are virtual machines.

* * * * *